Figure 1:
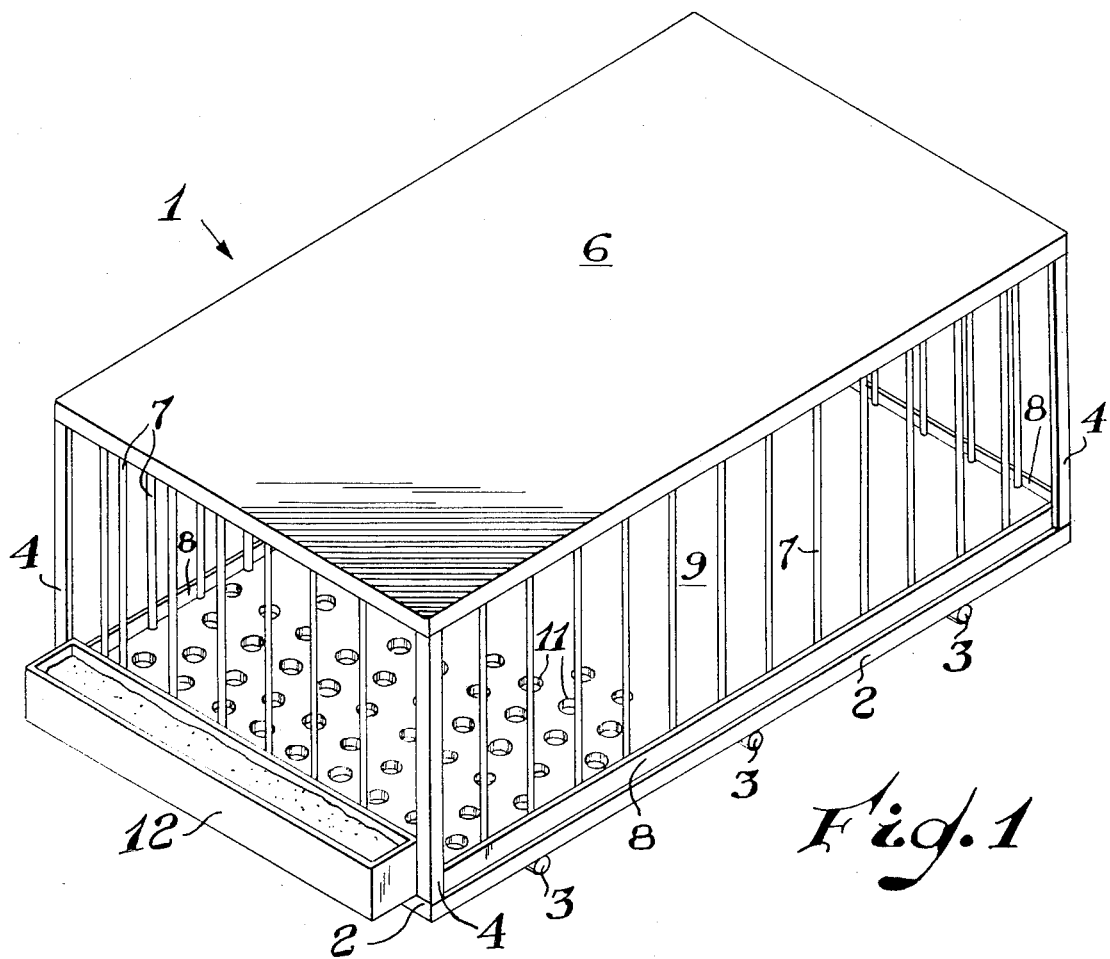

United States Patent [19]
Stevenson et al.

[11] 3,771,495
[45] Nov. 13, 1973

[54] POULTRY CAGE FLOOR AND POULTRY CAGE

[75] Inventors: Graham T. Stevenson; Charles Johnston, both of Midland, Mich.

[73] Assignee: The Dow Chemical Company, Midland, Mich.

[22] Filed: Jan. 10, 1972

[21] Appl. No.: 216,616

[52] U.S. Cl. ............................ 119/17, 52/2, 52/309, 52/622, 119/28
[51] Int. Cl. ............................................ A01k 31/00
[58] Field of Search .................... 119/17, 22, 28, 19; 52/2, 309, 622

[56] References Cited
UNITED STATES PATENTS

| | | | |
|---|---|---|---|
| 3,641,983 | 2/1972 | Keen et al. | 119/17 |
| 3,461,844 | 8/1969 | Harrison | 119/28 |
| 3,516,894 | 6/1970 | Slosberg | 52/309 X |
| 3,014,829 | 12/1961 | Curtin | 52/309 |
| 3,687,330 | 8/1972 | Herolzer | 119/19 X |

Primary Examiner—Louis G. Mancene
Assistant Examiner—J. N. Eskovitz
Attorney—William M. Yates et al.

[57] ABSTRACT

A poultry cage for confining poultry during growth which will reduce the incidence of blisters on the keel bursa of the poultry comprises a base, a plurality of vertically disposed side walls which define an enclosure, and a floor in the form of a sheet of generally planar configuration positioned within the enclosure for supporting the poultry. The floor has a plurality of openings to allow the passage of poultry droppings therethrough and comprises a flexible, resilient layer of an elastomer such as polyvinylchloride. In another embodiment, the floor comprises a flexible, resilient layer of an elastomer such as cellular polyurethane and a wear resistant layer such as burlap bonded to the upper surface of the cellular polyurethane to protect the floor against wear by the poultry.

14 Claims, 5 Drawing Figures

PATENTED NOV 13 1973 3,771,495

SHEET 1 OF 2

POULTRY CAGE FLOOR AND POULTRY CAGE

This invention relates to poultry cages. In one aspect, this invention relates to poultry cages of a type which is intended to confine poultry during growth to market size. In another aspect, this invention relates to floors for supporting poultry in a poultry cage.

Poultry growers throughout the world spend considerable amounts of time and money to provide an environment wherein their poultry will thrive and mature rapidly into high quality delectable fowl. The ability to raise top quality poultry is important to the grower because the price which can be exacted for the resulting fowl is directly proportional to the quality of the poultry. Since the price per pound of the fowl is based upon the grade and since the grade is in turn determined by the appearance, it is evident that the fowl should be free of blemishes, scars, blisters, and the like. The presence of these abnormalities can result in the fowl being downgraded or condemned as being unfit for human consumption. In raising poultry such as chickens from brooder chick size to broiler size, which normally requires a growing period of about six to about ten weeks, the birds must be protected and raised under conditions which prevent them from injuring themselves so as to degrade their appearance and hence lower their quality. In the latter part of the growing cycle, the birds develop rapidly and gain considerable weight. During this period, for one reason or another but probably due to the increase in weight, the birds spend a considerable amount of time floundering and resting on their breasts rather than standing in an upright position. If the support surface under the birds is hard, such as a wire support base in a cage or a wooden floor in a brooder house, considerable wear is imparted to the breasts of the birds during their normal activities. This wear to the breast will quickly irritate the bursa of the sternum and eventually result in the development of large fluid-containing blisters.

While poultry growers have long recognized this problem and the disastrous results in terms of the birds being downgraded or condemned, an effective and inexpensive solution to this problem does not exist in the art of poultry growing. Growers have long appreciated that poultry cannot be raised successfully to maturity in cages on a commercial scale because of the inability to provide a support which will not produce deformities in the birds. In order to circumvent this problem, poultry are usually raised in large brooder pens which utilize soft earth or sawdust as a support material. While this approach has been reasonably effective for raising poultry in brooder pens, regular refurbishment of the support material is required because the birds will compact the material such that a hard surface crust will form. The support material must then be cultivated or otherwise broken up in order to avoid the deleterious results of the hard surface crust. Moreover, as the poultry droppings accumulate in the support material, in a comparatively short time it will have to be replaced. Of course, the soft earth or sawdust-type of support is satisfactory only in brooder pens and is not practical for use in cages.

According to this invention, poultry can be confined and successfully grown in a cage of a type which will substantially reduce and in many cases completely eliminate blisters on the keel bursa of the poultry. The poultry cage of this invention comprises a base, side walls which define an enclosure, and floor means disposed within the enclosure, the floor means comprising a resilient sheet which will compress under the weight of the poultry and thereby aid in preventing blisters on the bursa of the poultry. The floor means has a plurality of openings to allow the passage of poultry droppings therethrough.

Accordingly, it is an object of this invention to provide an improved poultry cage for confining poultry during growth.

Another object of this invention is to reduce the incidence of blisters on the keel bursa of poultry.

A further object of this invention is to provide an improved floor for a poultry cage.

Yet another object of this invention is to provide a poultry cage wherein poultry of improved quality can be obtained at maturity.

These and other objects of the invention will become apparent to one skilled in the art after studying the following detailed description, the appended claims, and the accompanying drawings wherein:

FIG. 1 is a perspective illustration of a poultry cage constructed in accordance with one embodiment of the invention; and FIGS. 2, 3, 4 and 5 are perspective illustra-tions of floors for poultry cages constructed in accordance with several illustrative embodiments of the invention.

Referring now to the drawings, wherein like reference numerals are used to denote like elements when convenient, the several illustrated embodiments of the invention will be described in more detail. Auxiliary poultry growing equipment which may be desirable such as heating and lighting elements, apparatus for removing poultry droppings from beneath the cage, and the like, not necessary in explaining the invention to one skilled in the art, have been omitted from the drawings for the sake of clarity.

In FIG. 1, a poultry cage shown generally by reference numeral 1 comprises a horizontally positioned base which includes metal straps 2 and spaced metal rods 3. A plurality of vertical metal straps 4 and a top 6 together with the straps 2 and the rods 3 define a box-like frame. The straps 2 and 4 are preferably L-shaped and fabricated of a metal such as tin stock or aluminum. The straps can be bolted together at the corners or united by welding as desired. The rods 3 can be secured to the underside of the straps by welding.

The poultry cage 1 also includes a plurality of vertically positioned side walls each of which are constructed from the multitude of spaced heavy gauge wires 7 and a metal strap 8. The wires 7 and straps 8 are preferably joined in individual sections so that the side walls can be slidably removed from the box-like frame when the top 6 has been removed. As indicated by FIG. 1, the side walls are supported by the L-shaped straps 2 and arranged in a manner to define an enclosure with the base.

A floor 9 in the form of a sheet of generally planar configuration is disposed within the enclosure and supported by the base including the straps 2 and the spaced rods 3. The floor 9 has a plurality of openings 11 which will allow the passage of poultry droppings from the cage. As will be more fully hereinafter explained, the floor 9 comprises a resilient sheet which will yield or flex under the weight of the poultry and thereby provide a comfortable support. A tray 12 for holding poultry feed is attached along one side of the cage. Water receptacles and additional feed trays can be secured to the other sides of the cage as desired.

As illustrated in more detail by FIGS. 2 through 5 of the drawings, the floor 9 comprises a resilient sheet 13 which will compress under the weight of the poultry. The resilient sheet can be in the form of a cellular polymer material, a bladder containing a fluid, a plurality of closed pockets containing a fluid, and the like. Any suitable resilient material can be employed without departing from the spirit and scope of the invention.

Figure 2:
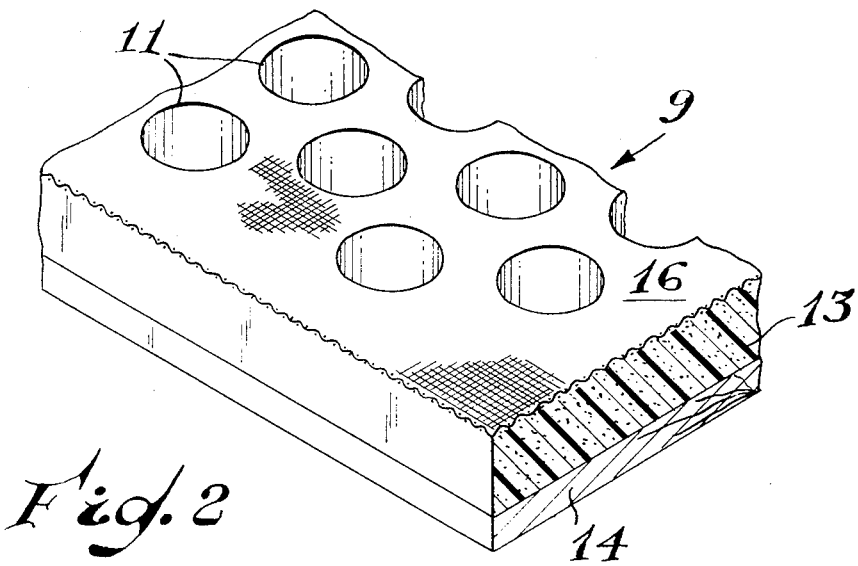
Figure 3:
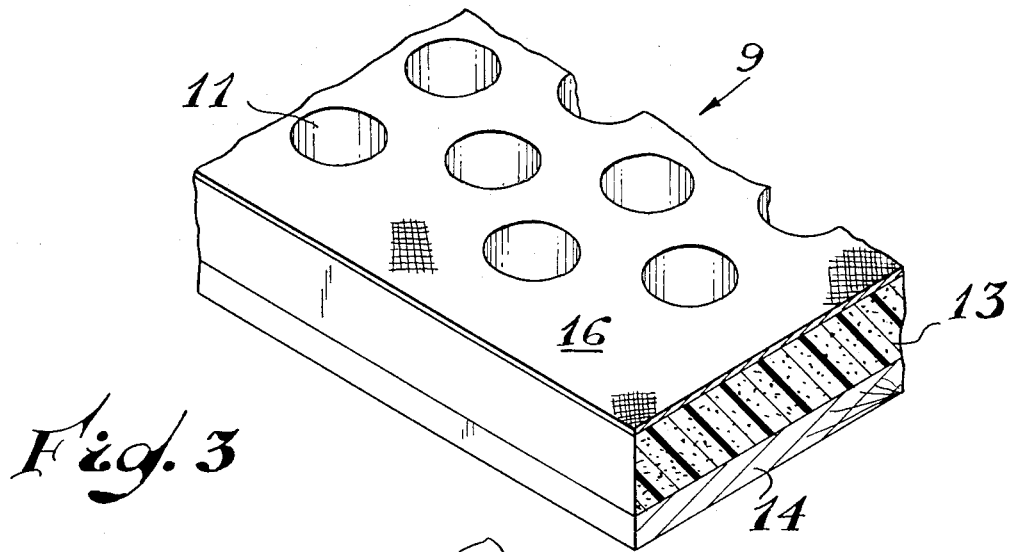
Figure 4:
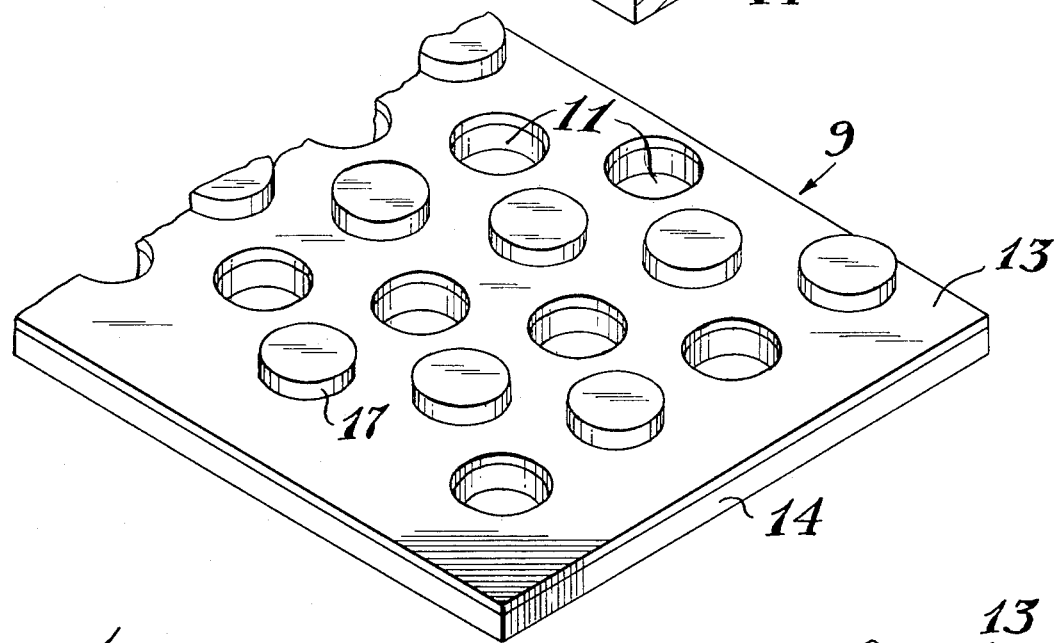
Figure 5:
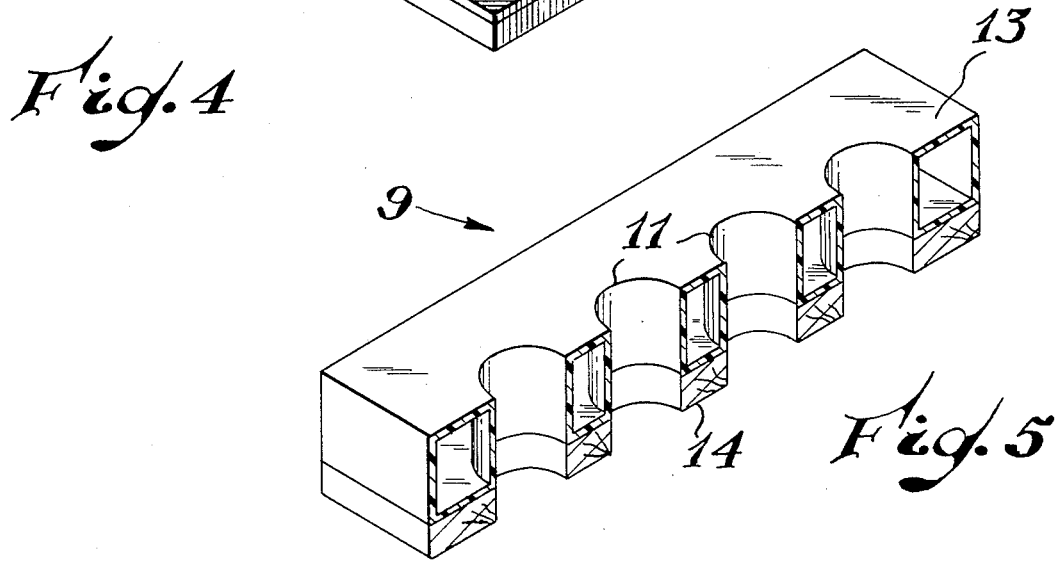

In FIG. 2, the floor 9 comprises a resilient sheet 13 of a cellular polymer material, a support layer 14 of fiberboard, and a wear resistant layer 16 in the form of a glass fiber screen. In FIG. 3, the floor 9 comprises a resilient layer 13 of cellular polymer material, a support layer 14 of fiberboard, and a wear resistant layer 16 of burlap bonded to the upper surface of the layer of cellular polymer material. The floor 9 illustrated by FIG. 4 of the drawing comprises a resilient layer 13 having a plurality of closed pockets 17 containing a fluid in the form of a gas such as air or a liquid such as water. A support layer 14 of fiberboard is disposed beneath and secured to the resilient layer 13. In FIG. 5 of the drawings, the floor 9 comprises a resilient sheet 13 in the form of a bladder containing a fluid such as air or water and a support layer 14 of fiberboard. The resilient sheet 13 in FIGS. 4 and 5 of the drawings can be fabricated from sheets or films of any suitable polymer material such as polyvinylchloride and the like. The resilient sheet in these embodiments can be molded or vacuum formed.

In those embodiments of the invention wherein the resilient sheet is in the form of a cellular polymer material, the polymer material is preferably an elastomer. Illustrative polymers which can be employed include natural rubber, synthetic diolefin polymers such as polybutadiene, styrene/butadiene rubber copolymers, polyurethanes, olefin polymers such as polyethylene, silicone polymers, polyvinylchloride, and the like. The polymer material which is used will depend upon such factors as economics, durability required, and the like. Polyurethane and polyvinylchloride are particularly suitable for constructing these resilient cellular sheets.

The wear resistant layer is an optional feature in the floor of the poultry cage and need not be employed when the resilient layer is highly durable. The support layer in the poultry cage floor is also optional and need not be employed in all constructions. For example, when the metal rods 3 are closely spaced the support layer is unnecessary. When a support layer is present, it can be bonded to the resilient layer or it can be used as a separate removable layer. The support layer can be made of fiberboard, plywood, rigid plastic, and the like. In another modification of the invention, the poultry cage floor can have a wear resistant laye on both surfaces. In this construction, the floor can be inverted to allow both surfaces to be used as a support for the poultry. In another modification of the invention, the interior edges of the openings 11 can be provided with a layer of wear resistant material. This will protect the edges of the openings and thus prolong the life of the floor. The exterior edges around the perimeter of the floor can also be provided with a wear resistant surface if desired.

As indicated above, the wear resistant layer can be made of glass fiber or burlap. Other materials which can be employed include nylon screen, polypropylene filaments, plastic film, and the like. The wear resistant layer can be adhered to the resilient layer by any suitable adhesive or it can be molded into the surface of the resilient layer during fabrication of the floor. The wear resistant layer can also be a polymer material such as polyurethane, polyvinylchloride, or the like which can, for example, be deposited on the resilient layer from solution. For example, a polyurethane resilient layer in the form of a foam can be provided with a surface coating of polyurethane or polyvinylchloride. Similarly, a cellular polyvinylchloride resilient layer can be provided with a coating of polyvinylchloride, polyurethane, or the like. In that embodiment wherein the resilient layer is a cellular polymer material, the wear resistant layer can be formed by collapsing a layer of cells on the surface of the resilient layer to provide a tough outer skin. This can be accomplished by applying controlled quantities of heat to the surface of the resilient layer. The interior edges of the openings in the resilient layer can also be heat treated to provide a skin around the circumference of the openings.

The materials used in fabricating the wear resistant layer, the resilient layer, and the support layer can be employed in various combinations in the poultry cage floor. Thus, for example, a burlap wear resistant layer can be employed in the floor constructions illustrated by FIGS. 4 and 5. The actual combination of materials will be dictated by such factors as economics, intended life of the floor, and the like.

The floor of the poultry cage can be fabricated by any suitable and convenient technique. When the floor includes two or more layers, they can be bonded together by roll lamination or by means of a platen press. Adhesives can be used to secure the support layer and the wear resistant layer to the resilient layer. The openings in the poultry cage floor can be obtained by suitable cutters. When the floor is prepared by molding, the openings can be formed during molding, for example, by using molds having diametrically opposed projections. It is also within the spirit of the invention to dispose a wire grid within the resilient layer, particularly where the resilient layer is a cellular polymer material. This modification will increase the rigidity of the floor.

The poultry cage floor can be of any suitable size and thickness depending upon such factors as the type of materials employed in its construction, the length of time it will be used, and the like. The size in terms of surface area will depend upon the size of the poultry cage. The floor can have a surface area up to several hundred square feet. In general, the resilient layer is of a thickness between about 125 mils and about 3 inches. The wear resistant layer is of a thickess between about 0.5 mil and about 0.5 inch. The support layer, which can be fabricated of fiberboard, metal, plastic, and the like, has a thickness of at least about 0.5 mil and preferably between about 1 mil and about 0.5 inch. The openings in the poultry cage floor can likewise be of any suitable size and configuration but are preferably circular having a diameter between about 0.25 inch and about 1.5 inches. The openings should be present in a sufficient number to ensure that substantially all of the poultry droppings will pass through the floor. In general, it is preferred to align the openings in offset rows with the space between the individual openings being equal to about one-half the diameter of the openings. In the most preferred embodiment of the invention, the generally planar poultry cage floor has a smooth upper surface without any irregularities.

While the poultry cage has been described as being fabricated of metal, it is evident that the box-like frame and the side walls can be constructed of wood or rigid plastic if desired.

The following examples illustrate the improved results obtained with a poultry cage floor constructed in accordance with the invention. It is to be understood that these examples are for the purpose of illustration only and should not be construed as limiting of the invention.

EXAMPLE I 32 six-week old cockerels (crossed Arbor Acre and Vantress White Rock) were placed in a poultry cage of the type illustrated by FIG. 1 of the drawings. The cockerels had previously been raised on a broiler house floor to avoid any irritations to the keel bursa. The cage had a floor comprising a support layer of fiberboard about one-eighth inch thick, a resilient layer of polyurethane foam about one-quarter inch thick, and a wear resistant layer of burlap to the upper surface of the resilient layer. The polyurethane foam had a density of about 10 pounds per cubic foot. The floor was provided with circular openings each about 1.25 inches in diameter with a space of about 1 inch between the edges of the openings. The openings were arranged in rows with the openings in one row being offset with respect to the openings in the next adjacent row. The floor had a gross surface area of about 13 square feet. The cockerels were fed and watered without restraint. At the end of three weeks (birds now nine weeks old) the cockerels were removed from the cage and inspected for quality. Of the 32 birds being tested, 16 exhibited no irritations to the bursa, 12 exhibited some hardening or callousing of the epidermis, three had subdermal blisters, and one had a bruise on the breast. The wear resistant burlap layer was in excellent condition at the end of the test period with no indication of wear or failure. The wear resistant surface was very clean and none of the openings in the floor were plugged.

EXAMPLE II

Several poultry cage floors were tested to illustrate the improved results obtained with the poultry cage floors of the invention. In these runs, one each of the floors was disposed in seven separate poultry cages similar to that illustrated by FIG. 1 of the drawings. 16 two-week old cockerels (crossed Arbor Acre and Vantress White Rock) were placed in each cage. Each of the floors had a gross surface area of about 6.5 square feet thereby providing about 0.4 square foot of floor space for each bird. The type of floor and size of the openings in each floor are indicated in Table I below. After being in the cages for six weeks, the birds were removed and inspected. The results in terms of irritations to the keel bursa are also reported in Table I.

TABLE I

| Cage No. | Floor construction | | | | Type of blisters (number of birds) | | | | |
|---|---|---|---|---|---|---|---|---|---|
| | Type | Thickness (inch) | Openings (inch) | Surface skin | Severe | Moderately severe | Moderate | Trace | None |
| 1 | 1-inch wire screen | | | | 1 | 3 | 4 | 2 | 6 |
| 2 | PEF[a] | 5/8 | 1.5, spaced 0.75 | 2 mil saran | 0 | 0 | 0 | 0 | 16 |
| 3 | PEF | 1 | do. | do. | 0 | 0 | 0 | 0 | 16 |
| 4 | PEF | 1 | 1.25, spaced 1 | do. | 0 | 0 | 0 | 0 | 16 |
| 5 | PEF | 1/2 | 1.5, spaced 0.75 | do. | 0 | 0 | 0 | 0 | 16 |
| 6 | Fiberboard | 1/8 | 1, spaced 0.5 | None | 0 | 1 | 1 | 4 | 10 |
| 7 | PEF | 1/4 | None | None | 0 | 0 | 0 | 0 | 16 |

[a] PEF means polyethylene foam.

As evidenced by the data reported in Table I, the wire poultry cage floor (cage No. 1) is unsatisfactory because of the blisters which resulted on the keel bursa of the birds. Similarly, the relatively hard fiberboard floor (cage No. 6) was also unsatisfactory. The floors in cages 2 through 5 were very satisfactory as evidenced by the fact that none of the 64 birds (16 in each cage) exhibited any irritations to the bursa. While the floor in cage No. 7 was suitable in terms of preventing blisters, fecal build-up was quite severe.

EXAMPLE III 16 two-week old cockerels (crossed Arbor Acre and Peterson) were placed in each of eight cages of the type described in Example II except with floors as described in Table II below. After being in the cages for six weeks, the birds were removed and inspected for blisters. The results of these evaluations are reported in Table II below.

TABLE II

| Cage No. | Floor construction | | | | Type of blisters (number of birds) | | | | |
|---|---|---|---|---|---|---|---|---|---|
| | Type | Thickness (inch) | Openings (inch) | Surface skin | Severe | Moderately severe | Moderate | Trace | None |
| 1[b] | PEF[a] | 1.5 | 1, spaced 0.75 | None | 0 | 0 | 0 | 0 | 15 |
| 2 | PEF | 1.5 | do. | Polyethylene | 0 | 0 | 0 | 0 | 16 |
| 3 | PEF | 1 | do. | None | 0 | 0 | 0 | 0 | 16 |
| 4 | PEF | 1 | do. | Saran | 0 | 0 | 0 | 0 | 16 |
| 5 | PEF | 3/4 | do. | None | 0 | 0 | 0 | 0 | 16 |
| 6 | PEF | 3/4 | do | Saran | 0 | 0 | 0 | 0 | 16 |
| 7 | 1-inch wire screen | | | | 8 | 1 | 4 | 1 | 2 |
| 8[b] | Fiberboard | 1/4 | 1, spaced 0.75 | | 0 | 1 | 1 | 3 | 10 |

[a] PEF means polyethylene foam.
[b] One bird died during the test.

As illustrated by the data recorded in Table II, the wire poultry cage floor (cage No. 7) is unsatisfactory because half of the birds exhibited severe blisters on the keel bursa and all of the birds except two demonstrated some form of irritation. The fiberboard cage floor (cage No. 8) is likewise unsatisfactory because five of the 15 birds had some form of irritation to the breast. The floors in cages 1 through 6 demonstrated superior results because none of the 95 birds showed any evidence of irritation to the keel bursa.

EXAMPLE IV

Three cages of the type illustrated by FIG. 1 of the drawings and each having floors with a gross surface area of about 15 square feed were used to evaluate different floor materials. In these runs, crossed Vantress White Rock and Arbor Acre cockerels each 34 days old were evaluated. The birds had previously been raised on a broiler house floor to avoid irritations to the keel bursa. Cage 1 had a floor comprising a support layer of fiberboard about one-eighth inch thick, a resilient layer of polyvinylchloride foam about one-half inch thick, and a wear resistant layer of solid polyvinylchloride about one-half mil thick on the upper surface. Cage 2 had the same type of floor as cage 1 except the wear resistant layer was omitted. Both of the floors had circular openings each about 1.25 inches in diameter with a space of about one inch between the edges of the openings. The openings were arranged in rows with the openings in one row being offset with respect to the openings in the next adjacent row. Cage 3 had a floor constructed with No. 9 wire arranged to define ½ inch square openings. Cage 4 was a broiler house pen with a floor of corn cobs about 4 inches deep. The birds were placed in the respective cages and fed and watered without restraint for 22 days. At the end of this period, the birds were removed and inspected for irritations to the keel bursa. The number of birds in each cage and the results obtained are reported in Table III below.

TABLE III

| Cage No. | No. of Birds | Birds with Blisters (Number/Percent) Topical | Subdermal |
|---|---|---|---|
| 1 | 25 | ¼ | 5/20 |
| 2 | 25 | ¼ | 4/16 |
| 3 | 16 | 16/100 | 16/100 |
| 4 | 185 | 10/5.4 | 74/40 |

As demonstrated by the data in Table III, the poultry cage floors of the invention (cages No. 1 and 2) are far superior to cage floors of wire (cage No. 3) and broiler house floors (cage No. 4) in terms of preventing irritations to the breasts of the birds. While only 5.4 percent of the birds raised on the corn cob floor had topical blisters, 40 percent of the birds exhibited subdermal blisters, which is more than twice as many as the birds raised on the poultry cage floors of the invention. As illustrated by the results achieved in cage No. 4, the wire floor produced both topical and subdermal blisters in all of the birds.

Although the invention has been described in considerable detail, such description is for the purpose of illustration only and many variations and modifications are possible without departing from the spirit and scope of the invention.

What is claimed is:

1. A poultry cage for confining poultry during growth to reduce the incidence of blisters on the keel bursa of the poultry, said cage comprising a horizontally positioned base of generally planar configuration, a plurality of vertically positioned side walls supported by said base and arranged to define an enclosure with said base, and a floor having a generally planar support surface for poultry supported by said base and disposed within the enclosure defined by said side walls and said base, said floor having a plurality of openings which will allow the passage of poultry droppings therethrough and comprising a flexible, resilient layer of cellular polyurethane which will compress and remain resilient when subjected to the weight of the poultry, a wear resistant layer bonded to the upper surface of said layer of cellular polyurethane to protect said layer of cellular polyurethane against wear by the poultry, and a support layer disposed below said layer of cellular polyurethane.

2. A poultry cage according to claim 1 wherein said horizontally positioned base includes a plurality of spaced metal rods.

3. In a poultry cage for confining poultry during growth comprising a base and side walls which define an enclosure, the improvement comprising floor means disposed within the enclosure for supporting poultry in a manner to reduce the incidence of blisters on the keel bursa of the poultry, said floor means comprising a resilient sheet having a generally planar support surface for poultry which will compress under the weight of the poultry, a wear resistant layer on the upper surface of said resilient sheet to protect said resilient sheet against wear by the poultry, and support means disposed beneath said resilient sheet for supporting said floor means, said floor means having a plurality of openings to allow the passage of poultry droppings therethrough.

4. A poultry cage according to claim 3 wherein said support means includes a plurality of spaced metal rods.

5. The poultry cage improvement according to claim 3 wherein the resilient sheet of said floor means includes a cellular polymer material.

6. A poultry cage according to claim 5 wherein the polymer material is an elastomer.

7. A poultry cage according to claim 3 wherein the resilient sheet of said floor means includes a bladder containing a fluid.

8. A poultry cage according to claim 3 wherein the resilient sheet of said floor means includes a plurality of closed pockets containing a fluid.

9. A poultry cage according to claim 3 wherein said support means includes a support layer.

10. A floor for a poultry cage to reduce the incidence of blisters on the keel bursa of poultry comprising a resilient sheet having a generally planar support surface for poultry which will compress under the weight of the poultry, a wear resistant layer secured to said resilient sheet to protect said resilient sheet against wear by the poultry, and a support layer in register with said resilient sheet opposite to said wear resistant layer, said floor having a plurality of openings to allow the passage of poultry droppings therethrough.

11. A floor according to claim 10 wherein said resilient sheet includes a cellular polymer material.

12. A floor according to claim 11 wherein the polymer material is an elastomer.

13. A floor according to claim 10 wherein said resilient sheet includes a bladder containing a fluid.

14. A floor according to claim 10 wherein said resilient sheet includes a plurality of closed pockets containing a fluid.

* * * * *